US012797302B2

(12) United States Patent
Miike et al.

(10) Patent No.: US 12,797,302 B2
(45) Date of Patent: Nov. 17, 2026

(54) LIGHT GUIDE

(71) Applicants: NEUROCEUTICALS INC., Tokyo (JP); PAX CO., LTD., Tokyo (JP); OTSUKA PHARMACEUTICAL FACTORY, INC., Naruto (JP)

(72) Inventors: Shinya Miike, Tokyo (JP); Hiroshi Endoh, Tokyo (JP); Takeshi Furuyama, Tokyo (JP); Yutaka Suzuki, Tokyo (JP)

(73) Assignees: PAX CO., LTD., Tokyo (JP); OTSUKA PHARMACEUTICAL FACTORY, INC., Naruto (JP); Otsuka Clinical Solutions, Inc., Okinawa (JP)

( * ) Notice: Subject to any disclaimer, the term of this patent is extended or adjusted under 35 U.S.C. 154(b) by 528 days.

(21) Appl. No.: 18/007,571

(22) PCT Filed: Jun. 4, 2021

(86) PCT No.: PCT/JP2021/021378
§ 371 (c)(1),
(2) Date: Dec. 1, 2022

(87) PCT Pub. No.: WO2021/246520
PCT Pub. Date: Dec. 9, 2021

(65) Prior Publication Data

US 2024/0407976 A1 Dec. 12, 2024

(30) Foreign Application Priority Data

Jun. 4, 2020 (JP) ................................ 2020-097941

(51) Int. Cl.
*A61J 15/00* (2006.01)

(52) U.S. Cl.
CPC ....... *A61J 15/0003* (2013.01); *A61J 15/0026* (2013.01)

(58) Field of Classification Search
CPC ................ A61J 15/0003; A61J 15/0007; A61J 15/0011; A61J 15/0026; A61J 15/0088;
(Continued)

(56) References Cited

U.S. PATENT DOCUMENTS 5,131,380 A * 7/1992 Heller .................... A61B 5/065 604/524
5,690,620 A * 11/1997 Knott ................. A61J 15/0088 604/523
(Continued)

FOREIGN PATENT DOCUMENTS

JP 2004-536639 A 12/2004
JP 2016077450 A 5/2016
(Continued)

OTHER PUBLICATIONS

Extended European Search Report issued in European Application No. EP21817420 dated Apr. 6, 2024.
(Continued)

*Primary Examiner* — Kami A Bosworth
*Assistant Examiner* — Avery Smale

(57) ABSTRACT

A light guide is to be used for inserting a medical tube into a body for nasogastric tube feeding. The light guide includes: a main body part having a long length, the main body part being configured to guide light entering a proximal end part from a light source device, to emit resultant light from a distal end part, where the main body part includes a linear part having a predetermined length from the distal end part, and a curved part continuous with the linear part. The curved part has a predetermined curvature radius. The linear part has a length in a range from 40 mm to 100 mm, and the curved part has a curvature radius in a range from 105 mm to 225 mm.

4 Claims, 8 Drawing Sheets

(58) Field of Classification Search
CPC ...... A61B 1/00165; A61B 1/07; A61M 25/09; A61M 2025/09175; A61M 2039/085
See application file for complete search history.

(56) References Cited

U.S. PATENT DOCUMENTS

| | | | | |
|---|---|---|---|---|
| 2005/0070788 | A1 | 3/2005 | Wilson et al. | |
| 2008/0027408 | A1 | 1/2008 | Wilson et al. | |
| 2008/0216827 | A1 | 9/2008 | Seydel et al. | |
| 2009/0306626 | A1 | 12/2009 | Sinha et al. | |
| 2010/0305503 | A1 | 12/2010 | Fang et al. | |
| 2016/0361236 | A1 | 12/2016 | Lim et al. | |
| 2018/0098871 | A1* | 4/2018 | Sasse | A61M 1/84 |
| 2021/0169580 | A1 | 6/2021 | Miike et al. | |

FOREIGN PATENT DOCUMENTS

| | | | |
|---|---|---|---|
| RU | 2257836 | C1 | 8/2005 |
| RU | 2540913 | C2 | 2/2015 |
| RU | 175240 | U1 | 11/2017 |
| WO | 2019/215791 | A1 | 11/2019 |
| WO | 2020059087 | A1 | 3/2020 |

OTHER PUBLICATIONS

Korean Office action from counterpart patent application 1020237000444, dated Apr. 16, 2025.
International Search Report of the ISA issued in PCT/JP2021/021378, mailed Aug. 17, 2021; ISA/JP.
Egyptian Office Action in related application EG2022121762, dated Jan. 12, 2022.
Japanese Office Action from counterpart JP2020097941, dated Aug. 30, 2023.
Chinese Office Action in related matter 202180040164.5, Dated Nov. 7, 2025.
Chinese Search Report issued in related matter 2021800401645, Dated Nov. 7, 2025.
Filipino Office Action issued in related patent application No. 1-2022-553430, Dated Oct. 27, 2025.
Malaysian Examination Report issued in related patent application No. PI2022006854, Dated Nov. 21, 2025.
Office Action issued in related Indian application IND202217074527, dated Jan. 20, 2026.
Decision of Refusal issued in corresponding Chinese patent application 202180040164.5, dated Mar. 28, 2026.
Written Opinion of the international searching authority (237) issued in related application PCT/JP2021/021378, dated Aug. 17, 2021.
Written opinion of the International Preliminary Examining Authority issued in related Application PCT/JP2021/021378, dated Apr. 26, 2022.
International Preliminary Report on Patentability issued in related application PCT/JP2021/021378, dated Jul. 8, 2022.
Appendix of written opinion of the International Preliminary Examining Authority issued in related Application PCT/JP2021/021378, dated Jun. 22, 2022.
Written Opinion issued in related application SG11202260791Q, dated Aug. 26, 2026.
Hearing Notice Issued in related Indian Patent Application IN202217074527, dated Sep. 9, 2026.

* cited by examiner

| | DIAMETER OF LIGHT GUIDE (mm) | CURVATURE RADIUS OF CURVED PART (mm) | LENGTH OF LINEAR PART (mm) | DISTANCE BETWEEN P1 AND P2 (mm) | DISTANCE BETWEEN P3 AND P4 (mm) |
|---|---|---|---|---|---|
| EXAMPLE 1 | 2 | 225 | 40 | 27 | 36 |
| EXAMPLE 2 | 2 | 225 | 70 | 25 | 37 |
| EXAMPLE 3 | 2 | 225 | 100 | 17 | 44 |
| EXAMPLE 4 | 2 | 105 | 40 | 13 | 14 |
| EXAMPLE 5 | 2 | 105 | 70 | 13 | 16 |
| EXAMPLE 6 | 1.5 | 200 | 40 | 24 | 30 |
| EXAMPLE 7 | 1.5 | 200 | 70 | 27 | 33 |
| EXAMPLE 8 | 1.5 | 200 | 100 | 36 | 37 |
| EXAMPLE 9 | 1.5 | 105 | 40 | 14 | 8 |
| EXAMPLE 10 | 1.5 | 105 | 70 | 18 | 12 |
| EXAMPLE 11 | 1.5 | 105 | 100 | 19 | 25 |

FIG. 8

LIGHT GUIDE

CROSS-REFERENCE TO RELATED APPLICATIONS

This application is a 371 U.S. National Phase of International Application No. PCT/JP2021/021378, filed on Jun. 4, 2021, which claims the benefit of Japanese Patent Application No. 2020-097941 filed Jun. 4, 2020. The entire disclosures of all of the above applications are incorporated herein by reference.

TECHNICAL FIELD

The present disclosure relates to a light guide.

BACKGROUND ART

By means of a technique called nasogastric tube feeding, food and drink are directly supplied to a stomach of a patient who has difficulty in oral ingestion of food and drink. Specifically, a medical tube is inserted into a nostril of a patient until the distal end part thereof reaches a stomach through an esophagus. After that, food and drink are injected from the proximal end part of the medical tube that is positioned outside the body.

Here, there has been known a technique for confirming that the distal end of the medical tube has reached a stomach through an esophagus.

For example, Patent Literature 1 discloses a detection wire including a pair of insulated electric wires and a sensor part formed at the distal end parts thereof. The detection wire is inserted into a medical tube, and a resistance value between the pair of insulated electric wires changes when the sensor part comes into contact with gastric juices. In this manner, it can be determined that the sensor part has come into contact with gastric juices based on a detection of a change in the resistance value between the pair of insulated electric wires, thereby being able to determine that the medical tube has reached the stomach in an appropriate manner.

CITATION LIST

Patent Literature

[PTL 1] Japanese Patent Application Publidation No. 2016-77450

SUMMARY OF INVENTION

Technical Problem

However, the medical tube described in Patent Literature 1 does not consider ease of insertion into a body of a patient.

An object of the present disclosure is to provide a light guide to be used for inserting a medical tube into a body for nasogastric tube feeding.

Solution to Problem

An aspect of the disclosure for achieving the aforementioned object is a light guide to be used for inserting a medical tube into a body for nasogastric tube feeding, the light guide comprising: a main body part having a long length, the main body part being configured to guide light entering a proximal end part from a light source device, to emit resultant light from a distal end part, wherein the main body part includes a linear part having a predetermined length from the distal end part, and a curved part continuous with the linear part, the curved part having a predetermined curvature radius, the linear part has a length in a range of from 40 mm to 100 mm, and the curved part has a curvature radius in a range of from 105 mm to 225 mm. Other features of the disclosure are made clear by the following description and the drawings.

Advantageous Effects of Invention

According to the present disclosure, it is possible to provide the light guide used to facilitate insertion of the medical tube into a body of a patient.

BRIEF DESCRIPTION OF DRAWINGS

FIG. 8 is a table showing various conditions and evaluation results of examples.

DESCRIPTION OF EMBODIMENTS

Embodiment

==Medical Tube Position Confirmation System==

Figure 1:
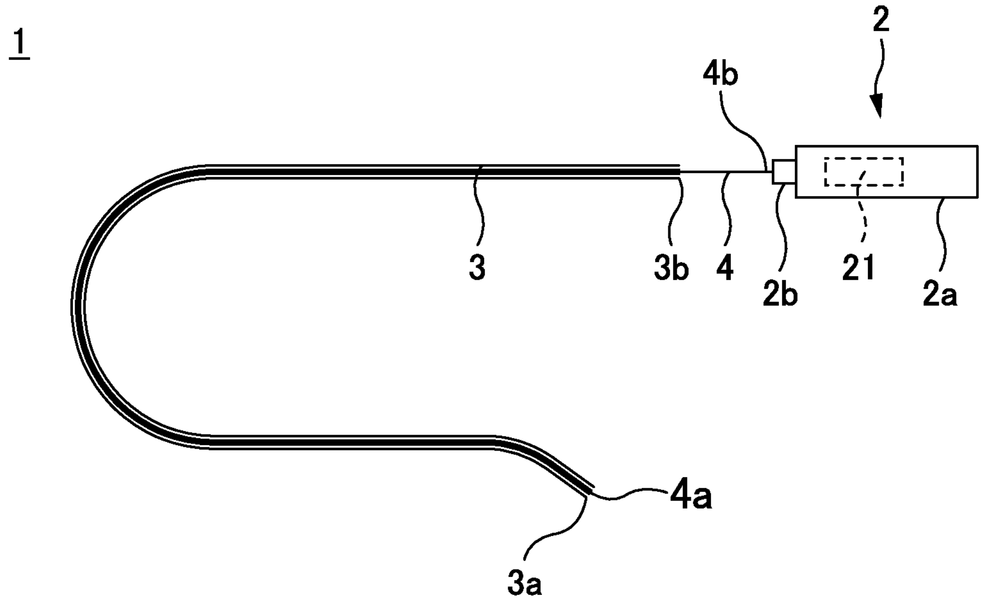
FIG. 1 is a diagram illustrating an entire configuration of a medical tube position confirmation system 1 according to an embodiment.

FIG. 1 is a diagram illustrating an entire configuration of a medical tube position confirmation system 1 according to an embodiment of the present disclosure. The medical tube position confirmation system 1 includes a light source device 2, a medical tube 3, and a light guide 4.

[Light Source Device]

The light source device 2 supplies light to the light guide 4. The light source device 2 includes a casing 2*a* and a light emitting part 2*b*. The casing 2*a* includes a light source 21 thereinside. The light source 21 generates light having a wavelength passing through a living body. The light emitting part 2*b* includes a lens group (not illustrated) for collecting the light generated by the light source 21, and emits the collected light to the outside. A proximal end part 4*b* of the light guide 4 is connected to the light emitting part 2*b*, and thus the light source device 2 is capable of supplying the light from the light source 21 to the light guide 4. The light from the light source 21 is used to confirm a position of a distal end part 3*a* of the medical tube 3 (described later in detail).

[Medical Tube]

The medical tube 3 is a flexible tubular body having a long length. The medical tube 3 includes the distal end part 3*a* and a proximal end part 3*b*. The medical tube 3 is used for a technique of nasogastric tube feeding. Specifically, an operator inserts the medical tube 3 through a nasal cavity of a patient, and causes the distal end part 3*a* of the medical tube 3 to reach a stomach through an esophagus. After that, food and drink are injected from the proximal end part 3*b* of the medical tube 3 that is positioned outside the patient body. This makes it possible to directly supply food and drink to the stomach of the patient.

[Light Guide]

Figure 2:
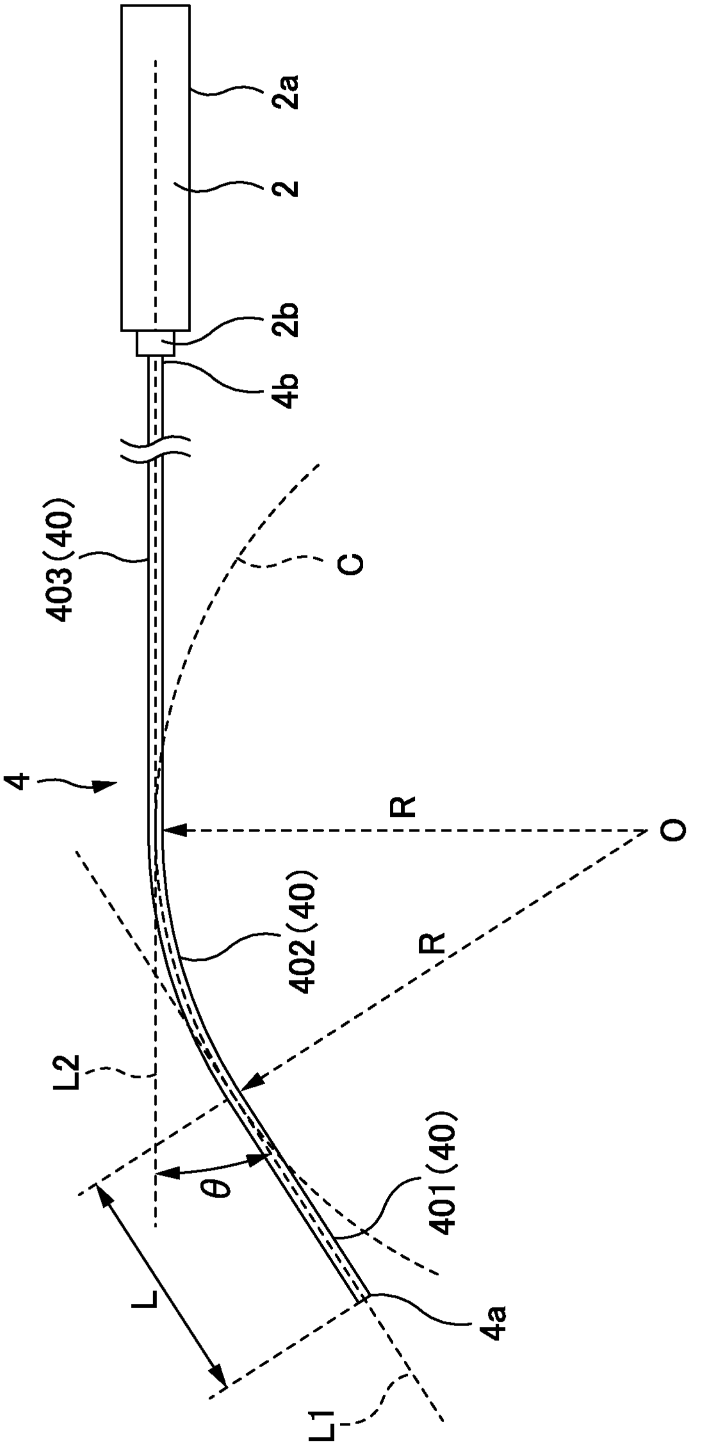
FIG. 2 is a diagram illustrating a configuration of a light guide according to an embodiment.

With reference to FIG. 2, the light guide 4 according to an embodiment of the present disclosure will be described. The light guide 4 is a member that has a long length and guides the light from the light source device 2. The light guide 4 includes a distal end part 4*a* and the proximal end part 4*b*. The light guide 4 is, for example, an optical fiber, and includes a core and a cladding. The core allows the light from the light source device 2 to be transmitted therethrough. Examples of a material of the core include quartz, glass, plastic, and the like. The cladding fills the outside of the core. Examples of a material of the cladding include quartz, glass, plastic, and the like, and the material has a refractive index smaller than that of the core. The light entering the light guide 4 propagates through the core while repeating total reflection at a boundary surface between the core and the cladding.

The light guide 4 has elasticity. When the light guide 4 receives an external force, and a shape thereof deforms from a natural state, a restoration force for restoration to the natural state is generated inside the light guide 4. Here, the natural state is a state in which no external force is received. The shape of the light guide 4 will be described below in detail, and the shape of the light guide 4, which will described with reference to FIG. 2, is in the natural state.

The light guide 4 is insertable into the medical tube 3. When the light guide 4 is inserted into the medical tube 3, the shape of the medical tube 3 deforms in accordance with the shape of the light guide 4. In other words, the shape of the light guide 4 alone in the natural state substantially matches with the shape of the light guide 4 in the natural state when inserted into the medical tube 3.

The light guide 4 according to an embodiment of the present disclosure has a diameter in a range of from 0.7 mm to 2.5 mm. In a case where the diameter of the light guide 4 falls within this range, the light guide 4 is capable of maintaining the shape thereof, in the natural state, when inserted into the medical tube 3. Further, the light guide 4 is easily deformable in accordance with a shape inside a body, which facilitates insertion thereof.

When the diameter of the light guide 4 is smaller than 0.7 mm, a restoration force against an external force is excessively small, and thus, when the light guide 4 is inserted into the medical tube 3, the light guide 4 cannot maintain the shape in the natural state. In other words, the shape of the light guide 4 may be deformed in accordance with the shape of the medical tube 3. Accordingly, the shape of the light guide 4 alone in the natural state does not match with the shape of the light guide 4, in the natural state, when inserted into the medical tube 3.

When the diameter of the light guide 4 is larger than 2.5 mm, a restoration force against an external force is excessively large, and thus the light guide 4 is not easily deformed in accordance with a shape inside the body. Accordingly, it becomes difficult to insert the light guide 4 into the body.

The light guide 4 includes a main body part 40. The main body part 40 is a member having a long length. The main body part 40 has a diameter corresponding to the diameter of the light guide 4. The main body part 40 guides the light entering the proximal end part 4*b* of the light guide 4 from the light source device 2, to emit resultant light from the distal end part 4*a* of the light guide 4. The main body part 40 includes a linear part 401, a curved part 402, and an extended part 403.

The linear part 401 corresponds to a predetermined length L from the distal end part 4*a* of the light guide 4. An axial center of the linear part 401 is linear.

The linear part 401 has the length L in a range of from 40 mm to 100 mm. In a case where the length L of the linear part 401 falls within this range, the distal end part 3*a* of the medical tube 3 easily moves to the esophagus side at a bifurcation into an esophagus and a trachea when the medical tube 3 is inserted into the body of the patient, thereby being able to avoid insertion into the trachea.

In a case where the length L of the linear part 401 is smaller than 40 mm, the distal end part 3*a* of the medical tube 3 easily moves to the trachea side at the bifurcation into the esophagus and the trachea when the medical tube 3 is inserted into the body of the patient, which may result in insertion into the trachea.

In contrast, in a case where the length L of the linear part 401 is larger than 100 mm, the distal end part 3*a* of the medical tube 3 abuts against a nasopharynx of the patient when the medical tube 3 is inserted into the body of the patient, thereby being unable to promote insertion from an oropharynx to a hypopharynx due to the curvature of the curved part 402 continuous with the linear part 401, which makes it difficult to insert the medical tube 3 into the esophagus.

The curved part 402 is continuous with the linear part 401, and has a predetermined curvature radius R. An axial center of the curved part 402 forms an arc. In FIG. 2, part of a curvature circle C, which is a circle passing through the axial center of the curved part 402, is given by a broken line. Note that a tangent line to the end part of the curved part 402 on the distal end part 4*a* side at the axial center thereof matches with a linear line L1. In other words, the curved part 402 and the linear part 401 are smoothly connected to each other.

The curved part 402 has the curvature radius R in a range of from 105 mm to 225 mm. In a case where the curvature radius R of the curved part 402 falls within this range, the distal end part 3*a* of the medical tube 3 can be prevented from abutting against the nasopharynx of the patient when the medical tube 3 is inserted into the body of the patient.

In a case where the curvature radius R of the curved part 402 is smaller than 105 mm, the distal end part 3*a* of the medical tube 3 easily moves to the trachea side at the bifurcation into the esophagus and the trachea when the medical tube 3 is inserted into the body of the patient, which may result in insertion into the trachea.

In a case where the curvature radius R of the curved part 402 is larger than 225 mm, the distal end part 3*a* of the medical tube 3 abuts against the nasopharynx when the medical tube 3 is inserted into the body of the patient, which may make it difficult to further insert the medical tube 3.

More preferably, the curved part 402 has a curvature radius in a range of from 105 mm to 175 mm. Although details thereof will be described later, the distal end part 4*a* of the light guide 4 is located substantially at the same position as the distal end part 3*a* of the medical tube 3 in the state in which the light guide 4 has been inserted into the medical tube 3. Here, an operator visually recognizes the light that is emitted from the distal end part 4*a* of the light guide 4 and passes through an abdominal region of the patient, to thereby confirm the position of the distal end part 3*a* of the medical tube 3. In this event, as the distal end part 3*a* of the medical tube 3 inserted into the stomach of the patient reaches a position, in the stomach of the patient, nearer a surface of the abdominal region, an operator visually recognizes the light emitted from the distal end part 4*a* of the light guide 4 more easily, which is thus preferable. When the curvature radius R of the curved part 402 falls within the above-mentioned range, the distal end part 3*a* of the medical tube 3 reaches a position near the surface of the abdominal region. Accordingly, it becomes easy for an operator to visually recognize the light emitted from the distal end part 4*a* of the light guide 4.

In FIG. 2, the linear line L1 and a linear line L2 that are respective tangent lines to two ends of the curved part 402 at the axial center thereof are given by the broken lines. The linear line L1 is a tangent line to a joining part joined to the linear part 401 of the curved part 402 at the axial center thereof. The linear line L2 is a tangent line to a joining part joined to the extended part 403 of the curved part 402 at the axial center thereof. Here, a linear line passing through the axial center of the linear part 401 matches with the linear line L1.

An angle θ (see FIG. 2) formed by the tangent lines (the linear line L1 and the linear line L2) to two ends of the curved part 402 at the axial center thereof is in a range of 29 degrees or larger. In a case where the angle θ falls within this range, the distal end part 3*a* of the medical tube 3 can be prevented from abutting against the nasopharynx of the patient when the medical tube 3 is inserted into the body of the patient. In a case where the angle θ is smaller than this range, the distal end part 3*a* of the medical tube 3 abuts against the nasopharynx of the patient when the medical tube 3 is inserted into the body of the patient, which may make it impossible to promote insertion from the oropharynx to the hypopharynx due to the curvature of the curved part 402 continuous with the linear part 401, which may result in difficulty in insertion of the medical tube 3 into the esophagus.

The extended part 403 is continuous with the curved part 402 and extends to the proximal end part 4*b* of the light guide 4. Note that, at the joining part of the curved part 402 and the extended part 403, the tangent line (the linear line L2) to the curved part 402 at the axial center matches with a tangent line to the extended part 403 at the axial center. In other words, the curved part 402 and the extended part 403 are smoothly connected to each other.

Note that an aspect of the main body part 40 according to an embodiment of the present disclosure is a single member including the linear part 401, the curved part 402, and the extended part 403. Meanwhile, the linear part 401, the curved part 402, and the extended part 403 may be individually separated members, and connected to one another, to thereby constitute a single member of the main body part 40.

==Medical Tube and Light Guide inside Body==

Figure 3:
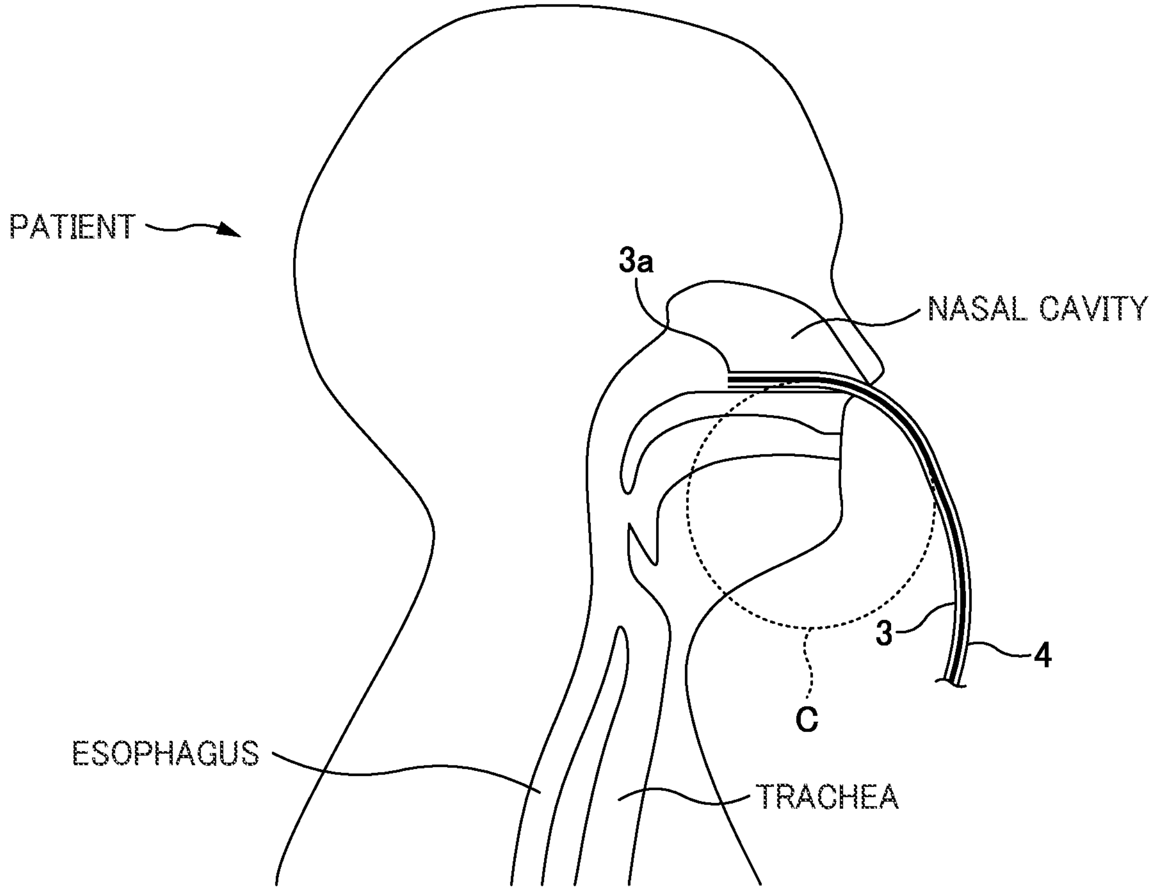
FIG. 3 is a diagram illustrating a medical tube and a light guide according to an embodiment inserted into a body.
Figure 4:
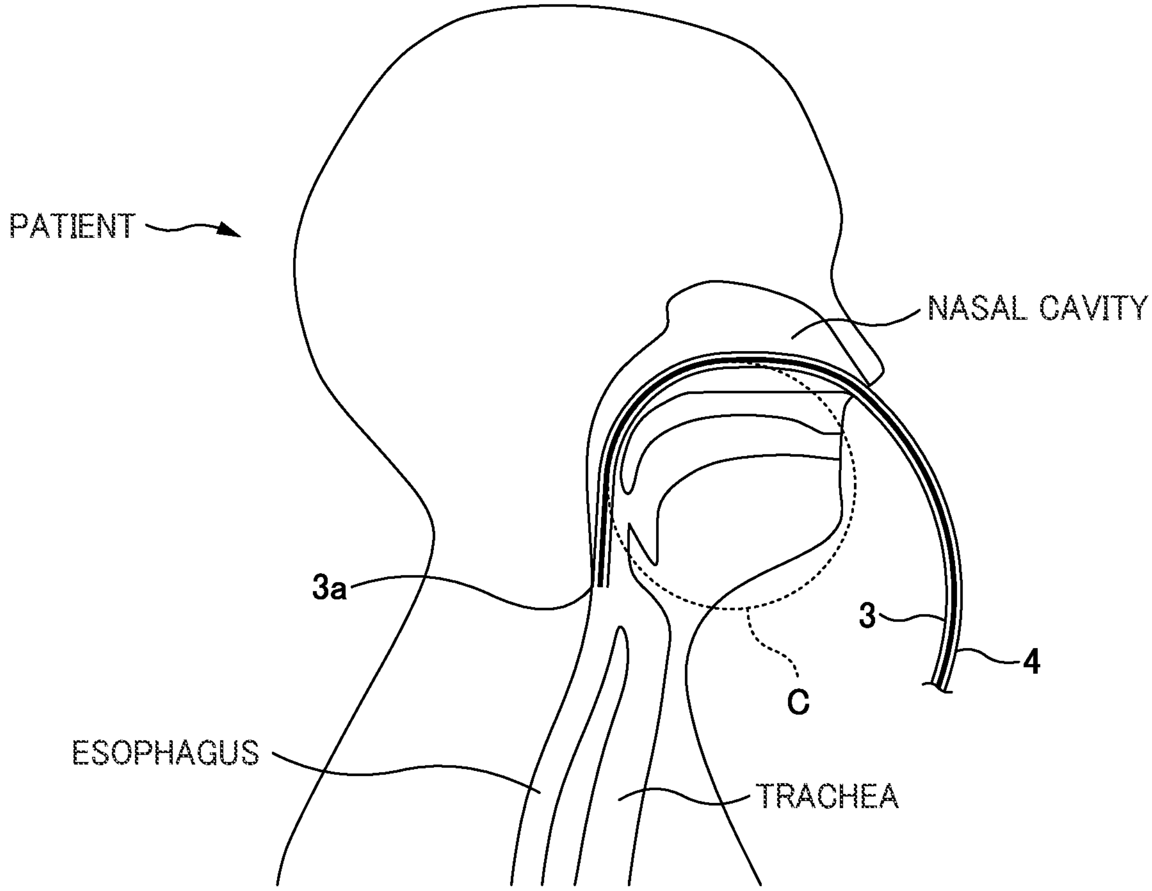
FIG. 4 is a diagram illustrating a medical tube and a light guide according to an embodiment inserted into a body.
Figure 5:
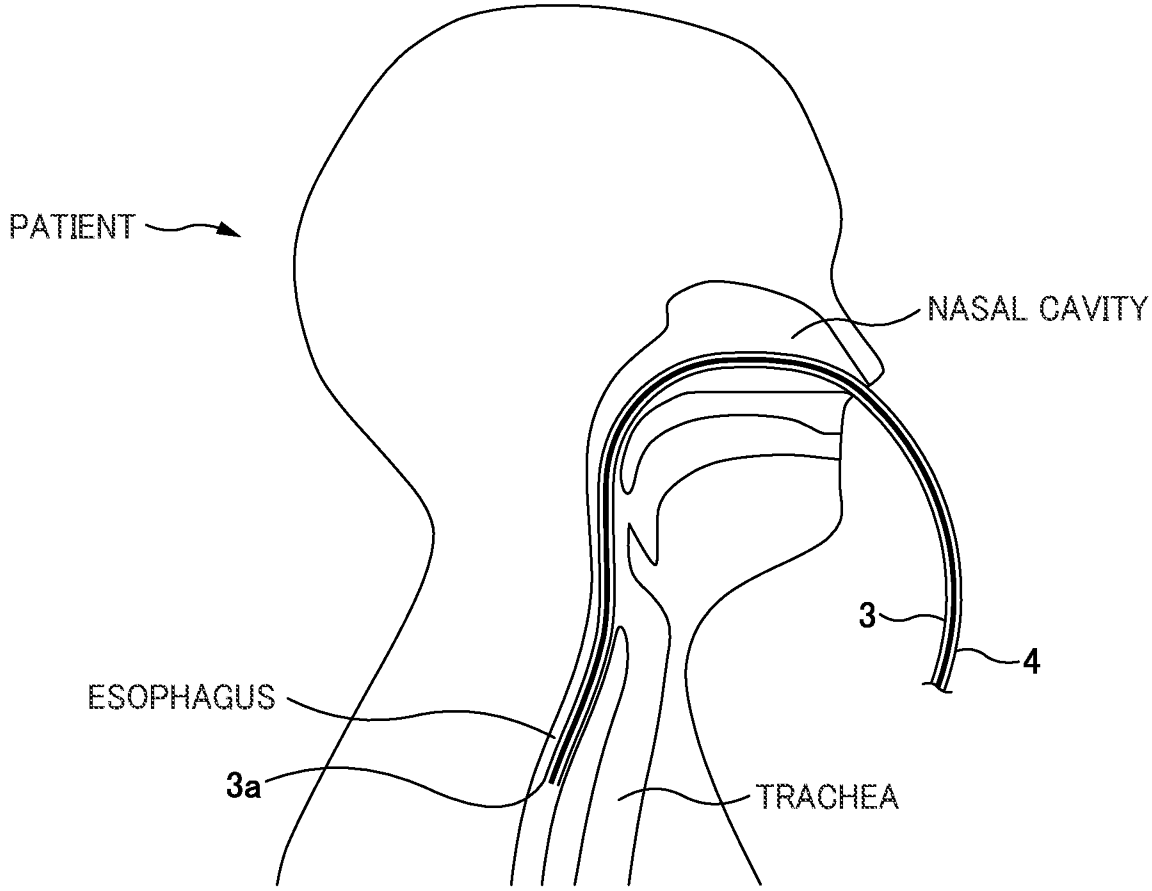
FIG. 5 is a diagram illustrating a medical tube and a light guide according to an embodiment inserted into a body.

With reference to FIG. 3 to FIG. 5, a state of the medical tube 3 and the light guide 4 in the body will be described. As described above, the medical tube 3 with the light guide 4 having been inserted therein is inserted into the body of the patient. In an embodiment of the present disclosure, the distal end part 4*a* of the light guide 4 is located substantially at the same position as the position of the distal end part 3*a* of the medical tube 3. Note that the present disclosure is not limited to an aspect in which the distal end part 4*a* of the light guide 4 is located substantially at the same position as the distal end part 3*a* of the medical tube 3, as long as the light emitted from the distal end part 4*a* of the light guide 4 is visually recognizable by an operator.

First, the medical tube 3 is inserted from the distal end part 3*a* into a nasal cavity or an oral cavity of the patient. FIG. 3 to FIG. 5 each illustrate an example in which the medical tube 3 is inserted from the nasal cavity. FIG. 3 illustrates a state in which the medical tube 3 is inserted into the nasal cavity by an amount corresponding to the length L of the linear part 401 from the distal end part 3*a*. In FIG. 3, the curvature circle C of the curved part 402 of the light guide 4 is given by the broken line. In the state of the medical tube 3 illustrated in FIG. 3, the curvature circle C of the curved part 402 of the light guide 4 is positioned on the oral cavity side of the patient. In the state of FIG. 3, the linear part 401 and the curved part 402 of the light guide 4 are substantially in the natural state.

FIG. 4 illustrates a state in which the medical tube 3 is further inserted into the body of the patient from the state of FIG. 3 and the linear part 401 of the light guide 4 reaches the pharynx of the patient. At this time, the linear part 401 and the curved part 402 of the light guide 4 are maintained substantially in the natural state, and the curvature circle C moves to the pharynx side as compared to FIG. 3.

In the process from FIG. 3 to FIG. 4, the curved part 402 of the light guide 4 is inserted into the nasal cavity. During this process, the medical tube 3 hardly receives a reaction force from inner walls of the nasal cavity and the pharynx, and the linear part 401 and the curved part 402 of the light guide 4 are maintained substantially in the natural state. When the curved part 402 is further inserted into the nasal cavity, the curved part 402 moves, substantially without a change in the position of the curvature circle C from the position illustrated in FIG. 4. In association therewith, the distal end part 3*a* of the medical tube 3 moves downward along the patient. Accordingly, the distal end part 3*a* of the medical tube 3 moves downward in the pharynx without abutting against the upper part of the pharynx of the patient.

Note that, in the state of FIG. 4, the distal end part 3*a* of the medical tube 3 does not reach the esophagus. In the state of FIG. 4, the distal end part 3*a* of the medical tube 3 is directed not toward the trachea side but toward the esophagus side. This is caused by the main body part 40 of the light guide 4 including the linear part 401.

When the medical tube 3 is further inserted into the body of the patient from the state of FIG. 4, the distal end part 3*a* of the medical tube 3 is inserted into the esophagus (FIG. 5). Then, when the medical tube 3 is further inserted into the body of the patient, the distal end part 3*a* of the medical tube 3 reaches the stomach of the patient.

In response to the light source device 2 being switched on at a given timing during the process of inserting the medical tube 3 into the body, light is emitted from the distal end part 4*a* of the light guide 4. An operator visually recognizes the light that is emitted from the distal end part 4*a* of the light guide 4 and passes through the patient, thereby being able to confirm the position of the distal end part 3*a* of the medical tube 3. Alternatively, the light that is emitted from the distal end part 4*a* of the light guide 4 and passes through the patient may be detected by an imaging device or the like, to thereby confirm the position of the distal end part 3*a* of the medical tube 3.

As described above, the light guide 4 according to an embodiment of the present disclosure is used for inserting the medical tube 3 into the body for nasogastric tube feeding, and includes the main body part 40 having a long length, the main body part 40 being configured to guide the light entering the proximal end part 4*b* from the light source device 2, to emit resultant light from the distal end part 4*a*. The main body part 40 includes the linear part 401 having the predetermined length L from the distal end part 4*a*, and the curved part 402 that is continuous with the linear part 401 and has the predetermined curvature radius R. The linear part 401 has the length L in a range of from 40 mm to 100 mm. The curved part 402 has the curvature radius R in a range of from 105 mm to 225 mm.

According to such a configuration as described above, the main body part 40 of the light guide 4 includes the curved part 402, thereby being able to prevent the distal end part 3*a* of the medical tube 3 from abutting against the nasopharynx when the medical tube 3 with the light guide 4 inserted therein is inserted into the body of the patient. The main body part 40 of the light guide 4 includes the linear part 401, and thus the distal end part 3*a* of the medical tube 3 passing through the pharynx moves not to the trachea side but to the esophagus side when the medical tube 3 with the light guide 4 inserted therein is inserted into the body of the patient. Accordingly, insertion of the medical tube 3 to the esophagus side is facilitated. In other words, the light guide 4 according to an embodiment of the present disclosure can be used to insert the medical tube 3 into the body of the patient easily.

In addition, in the light guide 4 described above, it is preferable that the curved part 402 has the curvature radius R in a range of from 105 mm to 175 mm. According to this configuration, in the stomach of the patient, the distal end part 3*a* of the medical tube 3 is positioned near a surface of the abdominal region of the patient. Accordingly, it becomes easy to visually recognize, from the outside the body, the light emitted from the distal end part 4*a* of the light guide 4 at the distal end part 3*a* of the medical tube 3, and hence an operator can accurately confirm the position of the distal end part 3*a*.

The medical tube position confirmation system 1 according to an embodiment of the present disclosure includes the light source device 2, the medical tube 3 to be used for nasogastric tube feeding, and the light guide 4 configured to guide the light from the light source device 2, the light guide 4, the light guide 4 being insertable into the medical tube 3. The light guide 4 includes the main body part 40 having a long length, the light guide 4 being configured to guide the light entering the proximal end part 4*b* from the light source device 2, to emit resultant light from the distal end part 4*a*. The main body part 40 includes the linear part 401 having the predetermined length L from the distal end part 4*a*, and the curved part 402 that is continuous with the linear part 401 and has the predetermined curvature radius R. The linear part 401 has the length L in a range of from 40 mm to 100 mm. The curved part 402 has the curvature radius R in a range of from 105 mm to 225 mm.

According to such a configuration as described above, the main body part 40 of the light guide 4 includes the curved part 402, thereby being able to prevent the distal end part 3*a* of the medical tube 3 from abutting against the nasopharynx when the medical tube 3 with the light guide 4 inserted therein is inserted into the body of the patient. The main body part 40 of the light guide 4 includes the linear part 401, and thus the distal end part 3*a* of the medical tube 3 passing through the pharynx moves not to the trachea side but to the esophagus side when the medical tube 3 with the light guide 4 inserted therein is inserted into the body of the patient. Accordingly, insertion of the medical tube 3 to the esophagus side is facilitated. In other words, according to the medical tube position confirmation system 1, the light guide 4 configured as such is included, thereby being able to easily insert the medical tube 3 into the body of the patient.

In the medical tube position confirmation system 1 described above, it is preferable that the curved part 402 has the curvature radius R in a range of from 105 mm to 175 mm. According to such a configuration, in the stomach of the patient, the distal end part 3*a* of the medical tube 3 is positioned near a surface of the abdominal region of the patient, and a distal end of 4*a* is directed toward the body front. Accordingly, it becomes easy to visually recognize, from the outside the body, the light emitted from the distal end part 4*a* of the light guide 4 at the distal end part 3*a* of the medical tube 3, and thus an operator can accurately confirm the position of the distal end part 3*a*.

EXAMPLES

The ease of insertion of the light guide into the body was evaluated using a human body model. Note that, as described in an embodiment, when the light guide is inserted into the medical tube, the shape of the medical tube is deformed in accordance with the shape of the light guide. Thus, when the light guide is inserted into the medical tube, the position and shape of the medical tube inside the body are substantially equivalent to the shape and position of the light guide. Accordingly, even when the medical tube is omitted as in examples of the present disclosure, similarly results are obtained as in the case where the light guide is inserted into the medical tube.

[Evaluation Method]

Figure 6:
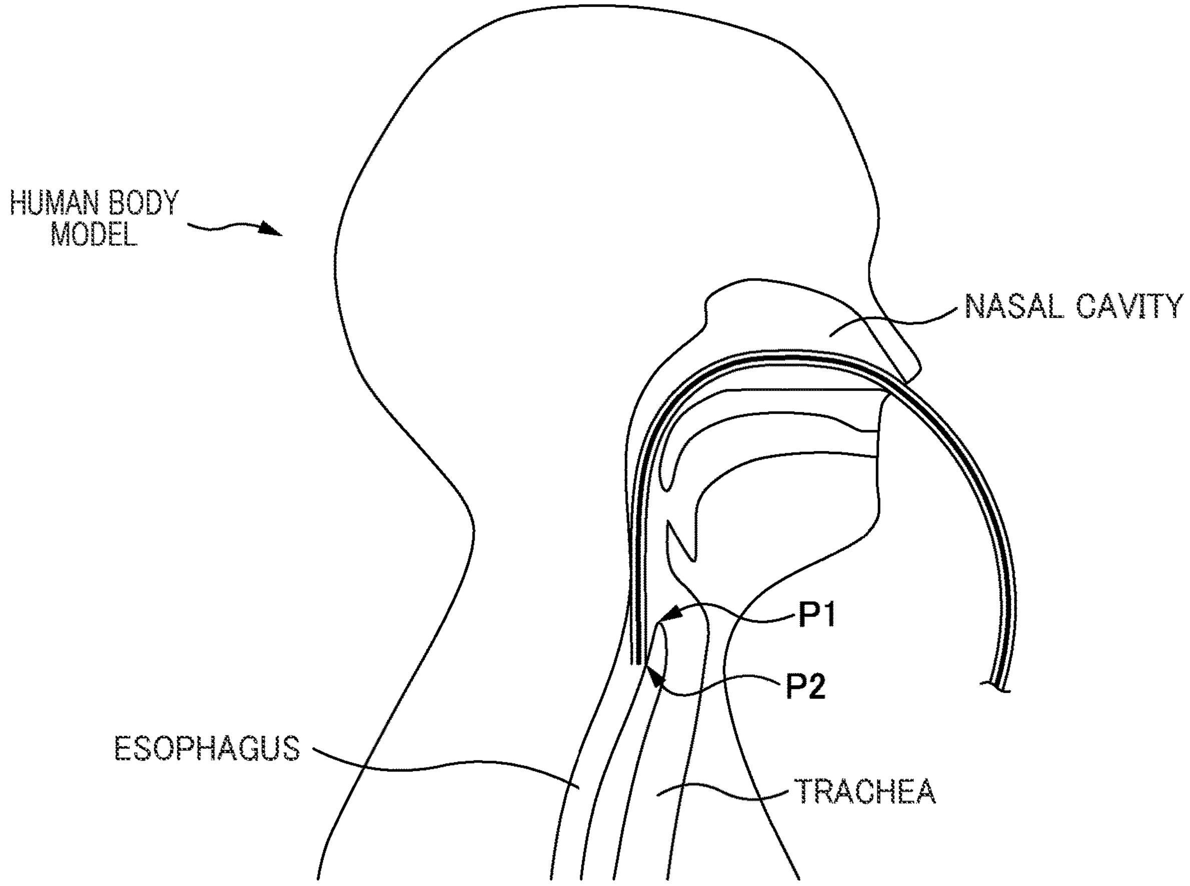
FIG. 6 is a diagram illustrating a light guide inserted into a human body model.
Figure 7:
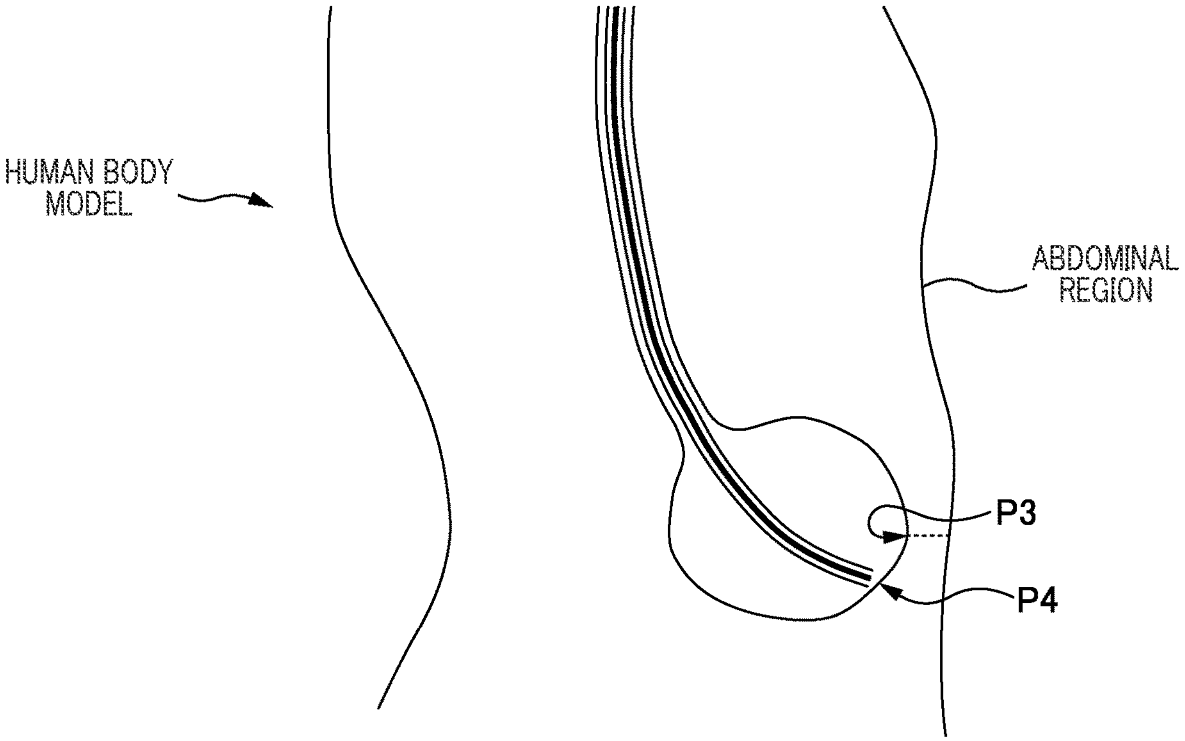
FIG. 7 is a diagram illustrating a light guide inserted into a human body model.

With reference to FIG. 6 and FIG. 7, a description will be given of a method of evaluating the ease of insertion of the light guide into a body. In examples of the present disclosure, the ease of insertion of the light guide into a body was evaluated through confirmation of the position of the distal end part of the light guide using the human body model. Specifically, focused are two positions that are a position P2 (described later in detail) of the distal end part of the light guide in the process of inserting the light guide from a nasal cavity of the human body model and a position P4 (described later in detail) of the distal end part of the light guide at the completion of insertion. Here, the time of completion of insertion indicates when the distal end part of the light guide has abutted against the stomach wall in the process of inserting the light guide from the nasal cavity of the human body model.

The position P2 is a position at which the distal end part of the light guide positioned near the pharynx has abutted against the inner wall of the esophagus in the process of inserting the light guide from the nasal cavity of the human body model and causing the distal end part of the light guide to reach the stomach.

In examples of the present disclosure, a position corresponding to the bifurcation into the esophagus and the trachea is referred to as position P1. Further, a distance between the position P1 and the position P2 was measured. When the distance between the position P1 and the position P2 was 12 mm or larger, it was determined that the distal end part of the light guide was able to be easily inserted into the esophagus.

The position P4 is a position on the stomach wall against which the distal end part of the light guide has abutted in a state in which insertion of the light guide has been completed using the human body model.

In examples of the present disclosure, among the positions on the stomach wall of the human body model, a position nearest a surface of the abdominal region of the human body model was referred to as a position P3. Further, a distance between the position P3 and the position P4 was measured. When the distance between the position P3 and the position P4 was 30 mm or smaller, it was determined that the visual recognition of the light emitted from the distal end part of the light guide was facilitated.

[Common Conditions]

In examples of the present disclosure, as the human body model, Tube Feeding Simulator (MW8) produced by Kyoto Kagaku Co., Ltd. was used. As the light guide, an optical fiber was used, and processed such that a curvature of the curved part and a length of the linear part meet the conditions.

[Individual Conditions]

FIG. 8 is a table showing conditions of the respective examples and evaluation results with respect thereto. Each of the examples gives conditions including the diameter of the light guide, the curvature radius of the curved part, and the length of the linear part.

[Evaluation Results]

In Examples 1 to 11, the distance between the position P1 and the position P2 was 12 mm or larger. As described above, when the distance between the position P1 and the position P2 was 12 mm or larger, the distal end part of the light guide can be easily inserted into the esophagus.

These results indicate that, when the length of the linear part is in a range of from 40 mm to 100 mm and the curvature radius of the curved part is in a range of from 105 mm to 225 mm, the distal end part of the light guide passing through the pharynx is more likely to move to the esophagus side without moving to the trachea side, when the light guide is inserted into the body of the patient. In other words, these results indicate that, when the length of the linear part and the curvature radius of the curved part fall within the respective ranges, the light guide can be easily inserted into the esophagus of the patient.

As described above, even when the light guide is inserted into the medical tube, similar results can be obtained as in the case where the medical tube is omitted as in examples of the present disclosure. Accordingly, the results in Examples 1 to 11 indicate that, when the length of the linear part and the curvature radius of the curved part fall within the respective ranges described above, the medical tube can be easily inserted into the esophagus of the patient.

In Examples 4, 5, 6, 9, 10, and 11, the distance between the position P3 and the position P4 was 30 mm or smaller. As described above, when the distance between the position P3 and the position P4 is 30 mm or smaller, the distal end part of the light guide is near a surface of the abdominal region of the patient, which makes it easy to visually recognize the light emitted from the distal end part of the light guide.

These results indicate that, when the curvature radius of the curved part is in a range of from 105 mm to 175 mm, the distal end part of the light guide reaches a position, in the stomach, near a surface of the abdominal region of the patient. In other words, those results indicate that it becomes easy to visually recognize the light emitted from the distal end part of the light guide.

Accordingly, the results in Examples 4, 5, 6, 9, 10, and 11 indicate that, in a case where the curvature radius of the curved part falls within the above-mentioned range, it becomes easy to visually recognize the light emitted from the distal end part of the medical tube through the light guide, even when the medical tube with the light guide inserted therein is inserted into the stomach of the patient.

REFERENCE SIGNS LIST

1: Medical tube position confirmation system;
2: Light source device;
2*a*: Casing;
2*b*: Light emitting part;
21: Light source;
3: Medical tube;
3*a*: Distal end part;
3*b*: Proximal end part;
4: Light guide;
4*a*: Distal end part;
4*b*: Proximal end part;
40: Main body part;
401: Linear part;
402: Curved part;
403: Extended part.

The invention claimed is:

1. A light guide to be used for inserting a medical tube into a body for nasogastric tube feeding, the light guide comprising:

a main body part having a length, the main body part being configured to guide light entering a proximal end part of the main body part from a light source, to emit the light from a distal end part of the main body part, wherein the main body part includes, in a natural state in which no external force is received by the main body part, a linear part having a predetermined length and extending from the distal end part, and a curved part continuous with the linear part, the curved part having a predetermined curvature radius, the predetermined length of the linear part is in a range from 40 mm to 100 mm, the predetermined curvature radius of the curved part is in a range from 105 mm to 225 mm, and when inserted into the medical tube, the light guide deforms a shape of the medical tube in accordance with a shape of the light guide.

2. The light guide according to claim 1, wherein the predetermined curvature radius of the curved part is in a range from 105 mm to 175 mm.

3. A medical tube position confirmation system comprising:

a light source device;

a medical tube to be used for nasogastric tube feeding; and a light guide configured to guide light from the light source device, the light guide being insertable into the medical tube, wherein the light guide includes a main body part having a length, the main body part being configured to guide the light from the light source device entering a proximal end part of the main body part, to emit the light from a distal end part of the main body part, the main body part includes a linear part having a predetermined length from the distal end part, and a curved part continuous with the linear part, the curved part having a predetermined curvature radius, the predetermined length of the linear part is in a range from 40 mm to 100 mm, and the predetermined curvature radius of the curved part is in a range from 105 mm to 225 mm.

4. The medical tube position confirmation system according to claim 3, wherein the predetermined curvature radius of the curved part is in a range from 105 mm to 175 mm.

* * * * *